(12) United States Patent
Miyata et al.

(10) Patent No.: US 9,194,435 B2
(45) Date of Patent: Nov. 24, 2015

(54) SLIDING BEARING

(75) Inventors: Kazuyuki Miyata, Kanagawa (JP); Ryohei Kaneko, Kanagawa (JP)

(73) Assignee: OILES CORPORATION, Tokyo (JP)

( * ) Notice: Subject to any disclaimer, the term of this patent is extended or adjusted under 35 U.S.C. 154(b) by 591 days.

(21) Appl. No.: 12/299,685

(22) PCT Filed: May 10, 2007

(86) PCT No.: PCT/JP2007/000500
§ 371 (c)(1),
(2), (4) Date: Jan. 29, 2009

(87) PCT Pub. No.: WO2007/132556
PCT Pub. Date: Nov. 22, 2007

(65) Prior Publication Data
US 2009/0180719 A1    Jul. 16, 2009

(30) Foreign Application Priority Data

May 12, 2006    (JP) .................................. 2006-134544

(51) Int. Cl.
| | |
|---|---|
| F16C 33/76 | (2006.01) |
| F16C 33/74 | (2006.01) |
| F16C 17/04 | (2006.01) |
| F16C 17/10 | (2006.01) |
| F16C 33/20 | (2006.01) |

(52) U.S. Cl.
CPC ................. *F16C 33/74* (2013.01); *F16C 17/04* (2013.01); *F16C 17/10* (2013.01); *F16C 33/20* (2013.01); *B60G 2204/418* (2013.01); *F16C 2361/53* (2013.01)

(58) Field of Classification Search
CPC ...... F16C 2326/05; F16C 17/04; F16C 33/74; F16C 33/20
USPC .......................... 384/130, 142–153, 420, 607
See application file for complete search history.

(56) References Cited

U.S. PATENT DOCUMENTS

| 3,844,631 | A | | 10/1974 | Otto et al. | |
|---|---|---|---|---|---|
| 4,925,323 | A | * | 5/1990 | Lederman ...................... | 384/607 |
| 4,969,752 | A | * | 11/1990 | Kubota et al. .................. | 384/420 |
| 2003/0109642 | A1 | * | 6/2003 | Gamlin et al. ................. | 525/242 |
| 2007/0237439 | A1 | * | 10/2007 | Watai et al. .................... | 384/420 |

FOREIGN PATENT DOCUMENTS

| DE | 38 09 703 A1 | 10/1989 |
|---|---|---|
| JP | 46-8485 | 3/1971 |

(Continued)

OTHER PUBLICATIONS

International Search Report for PCT/JP2007/000500, mailed Jun. 5, 2007.

*Primary Examiner* — Thomas R. Hannon
(74) *Attorney, Agent, or Firm* — Nixon & Vanderhye, P.C.

(57) ABSTRACT

A sliding bearing 1 including an upper casing 3 having an annular lower surface 2; a lower casing 5 which is superposed on the upper casing 3 so as to be rotatable about an axis O of the upper casing 3 and has an annular upper surface 4 opposed to the annular lower surface 2 of the upper casing 3; an annular thrust sliding bearing piece 7 disposed in an annular space 6 between the annular lower surface 2 and the annular upper surface 4; a seal 8 disposed on an outer peripheral side of the annular space 6; and a seal 9 disposed on an inner peripheral side of the annular space 6.

6 Claims, 4 Drawing Sheets

(56) References Cited

FOREIGN PATENT DOCUMENTS

| | | |
|---|---|---|
| JP | 46-8485 Y1 | 3/1971 |
| JP | 08 326758 A | 12/1996 |
| JP | 10-9256 | 1/1998 |
| JP | 10-9256 A | 1/1998 |
| JP | 2001-27227 | 1/2001 |
| JP | 2001-27227 A | 1/2001 |
| JP | 2001-27229 | 1/2001 |
| JP | 2001-27229 A | 1/2001 |
| JP | 2004-263771 | 9/2004 |
| JP | 2004-263771 A | 9/2004 |
| WO | WO 2004031601 A1 * | 4/2004 .............. F16C 33/12 |

* cited by examiner

SLIDING BEARING

This application is the U.S. national phase of International Application No. PCT/JP2007/000500, filed 10 May 2007, which designated the U.S. and claims priority to Japanese Application No. 2006-134544 filed 12 May 2006, the entire contents of each of which are hereby incorporated by reference.

TECHNICAL FIELD

The present invention relates to a sliding bearing, and more particularly to a sliding bearing which is suitably incorporated as a thrust sliding bearing of a strut-type suspension (Macpherson type) in a four-wheeled vehicle.

BACKGROUND ART

Patent document 1: JP-A-8-326758

In patent document 1, for example, a sliding bearing is proposed which is comprised of a synthetic resin-made lower casing; a synthetic resin-made upper casing superposed on this lower casing; a synthetic resin-made thrust sliding bearing piece disposed between the upper and lower casings; and an elastic seal means disposed on an outer peripheral side between the upper and lower casings. The elastic seal means includes a hollow cylindrical body portion fixed to an outer peripheral side of the lower casing; an annular elastic lip portion which is folded up from one end side of this hollow cylindrical body portion, is gradually enlarged in diameter, and extends toward the other end side of the hollow cylindrical body portion, the annular elastic lip portion being disposed concentrically with and on the outer side of the hollow cylindrical body portion and elastically abutting against an inner peripheral surface of an outer cylindrical portion of the upper casing; and a collar portion which is disposed on an annular stepped recess formed on an outer peripheral side of a lower surface of the lower casing, and which extends integrally from the other end of the hollow cylindrical body portion and has an annular lip at its inner peripheral end.

DISCLOSURE OF THE INVENTION

Problems To Be Solved By The Invention

Meanwhile, with such a sliding bearing, in a case where a mating member abutting against the lower surface of the lower casing is constituted by, for example, a spring seat formed by drawing, since the fabrication accuracy of the spring seat formed by drawing tends to be low, an unwanted gap may be produced between the lower casing and the spring seat, possibly causing the entry of dust, rainwater, muddy water, or the like. Furthermore, there is a possibility that, through the portion between the elastic seal means and the lower casing, dust, rainwater, muddy water, or the like may enter into an annular space between the lower casing and the upper casing where the thrust sliding bearing piece is disposed.

The present invention has been devised in view of the above-described aspects, and its object is to provide a sliding bearing which, even in a case where the fabrication accuracy of the mating member abutting against the lower casing is low, is capable of preventing with high sealability the entry of dust, rainwater, muddy water, or the like between the lower casing and the mating member, and hence the entry of dust, rainwater, muddy water, or the like between the lower casing and the upper casing.

Means For Solving The Problems

A sliding bearing in accordance with the invention comprises: an upper casing having an annular lower surface; a lower casing which is superposed on the upper casing so as to be rotatable about an axis of the upper casing and has an annular upper surface opposed to the annular lower surface of the upper casing; an annular thrust sliding bearing piece disposed in an annular space between the annular lower surface and the annular upper surface; and seal means disposed on an outer peripheral side of the annular space, wherein the seal means includes an outer peripheral seal portion disposed between the upper casing and the lower casing so as to seal the outer peripheral side of the annular space, and an annular elastic projection formed on a lower surface of the outer peripheral seal portion and projecting toward a mating member abutting against a lower surface of the lower casing.

According to the sliding bearing of the invention, particularly, the seal means has an annular elastic projection formed on the lower surface of the outer peripheral seal portion and projecting toward the mating member abutting against the lower surface of the lower casing. Therefore, even in a case where the fabrication accuracy of the mating member abutting against the lower casing is low, by causing that elastic projection to elastically abut against the mating member, an unwanted gap, particularly a gap leading to between the lower casing and the upper casing, is not produced between the lower casing and the mating member. Thus, it is possible to prevent with high sealability the entry of dust, rainwater, muddy water, or the like between the lower casing and the mating member, and hence the entry of dust, rainwater, muddy water, or the like between the lower casing and the upper casing.

In another preferred example of the sliding bearing of the invention, the upper casing includes an upper annular plate portion having the annular lower surface and an upper outer cylindrical portion formed integrally with a lower surface on an outer peripheral surface side of the upper annular plate portion, and the lower casing includes a lower annular plate portion having an annular upper surface, the lower annular plate portion having a large-diameter annular plate portion and a small-diameter annular plate portion formed integrally with a lower surface of the large-diameter annular plate portion, the lower surface of the large-diameter annular plate portion and an outer peripheral surface of the small-diameter annular plate portion forming in cooperation with each other an annular stepped portion on a lower surface on an outer peripheral surface side of the lower casing, the outer peripheral seal portion including an annular core which is fitted or secured to the lower annular plate portion and has an L-shaped cross section, and an annular elastic seal member which is secured to the core so as to cover the core, the elastic seal member including: an annular body secured to the core so as to cover the core; a flexible outer thin-walled annular projecting edge portion which is disposed on an outer peripheral side of the annular body, is formed integrally with an upper end of the annular body, and is brought into sliding contact with an inner peripheral surface of the upper outer cylindrical portion so as to seal the outer peripheral side of the annular space; and a flexible inner thin-walled annular projecting edge portion which is disposed on an inner peripheral side of the annular body, is formed integrally with a lower end of the annular body, and is brought into sliding contact with the annular stepped portion so as to seal the outer peripheral side of the annular space. According to such a preferred example, the elastic projection makes it possible to prevent the entry of dust, rainwater, muddy water, or the like between the lower casing and the mating member abutting against the lower surface of this lower casing. Furthermore, the inner thin-walled annular projecting edge portion makes it possible to prevent the entry of dust, rainwater, muddy water, or the like between the lower casing and the upper casing. Hence, the entry of dust, rainwater, muddy water, or the like can be prevented with higher sealability.

In still another preferred example of the sliding bearing of the invention, the outer thin-walled annular projecting edge portion is inclined in such a manner as to be gradually removed away from the upper annular plate portion as the outer thin-walled annular projecting edge portion approaches the upper outer cylindrical portion, and a maximum diameter of the outer thin-walled annular projecting edge portion is larger than or equal to a diameter of the inner peripheral surface of the upper outer cylindrical portion. According to such a preferred example, it is possible to eliminate the possibility of the outer thin-walled annular projecting edge portion being removed from the upper outer cylindrical portion, thereby allowing high sealability to be exhibited.

In a further preferred example of the sliding bearing of the invention, the inner thin-walled annular projecting edge portion is inclined in such a manner as to be gradually removed away from the upper annular plate portion as the inner thin-walled annular projecting edge portion approaches the outer peripheral surface of the small-diameter annular plate portion, and a minimum diameter of the inner thin-walled annular projecting edge portion is smaller than or equal to a diameter of the outer peripheral surface of the small-diameter annular plate portion. According to such a preferred example, high sealability can be exhibited by the inner thin-walled annular projecting edge portion as well.

In a still further preferred example of the sliding bearing of the invention, the elastic projection includes a small-diameter annular projection formed integrally on the lower surface of the outer peripheral seal portion and a large-diameter annular projection formed integrally on the lower surface of the outer peripheral seal portion and disposed on a more outer side than the small-diameter annular projection. According to such a preferred example, since each of the small-diameter annular projection and the large-diameter annular projection is disposed on the more outer peripheral side than the small-diameter annular plate portion abutting against the spring seat, each of the small-diameter annular projection and the large-diameter annular projection prevents the entry of dust, rainwater, muddy water, or the like between the spring seat and the lower annular plate portion, particularly into the more inner peripheral side of the lower annular plate portion than the small-diameter annular projection and the large-diameter annular projection, and furthermore the entry of dust, rainwater, muddy water, or the like into the annular space through the portion between, on the one hand, the annular stepped portion and the large-diameter annular plate portion and, on the other hand, the outer peripheral seal portion. In addition, according to such a preferred example, the small-diameter annular projection and the large-diameter annular projection make it possible to maintain satisfactory sliding between the upper casing and the thrust sliding bearing piece and/or between the lower casing and the thrust sliding bearing piece over extended periods of time by suppressing the relative sliding between the spring seat and the lower casing.

In a preferred example of the sliding bearing of the invention, the outer peripheral seal portion and the elastic projection are formed of a crosslinked rubber or a thermoplastic elastomer.

In a preferred example of the sliding bearing of the invention, at least one of the upper casing and the lower casing is formed of a synthetic resin, and the synthetic resin for forming at least one of the upper casing and the lower casing includes at least one of polyacetal resin, polyamide resin, polyester resin, polyolefin resin, polycarbonate resin, and fluororesin.

In a preferred example of the sliding bearing of the invention, the thrust sliding bearing piece is formed of a synthetic resin, and the synthetic resin for forming the thrust sliding bearing piece includes at least one of polyacetal resin, polyamide resin, polyester resin, polyolefin resin, polycarbonate resin, and fluororesin.

In a preferred example of the sliding bearing of the invention, the sliding bearing farther comprises seal means disposed on an inner peripheral side of the annular space.

Advantages Of The Invention

According to the invention, it is possible to provide a sliding bearing which, even in a case where the fabrication accuracy of the mating member abutting against the lower casing is low, is capable of preventing with high sealability the entry of dust, rainwater, muddy water, or the like between the lower casing and the mating member, and hence the entry of dust, rainwater, muddy water, or the like between the lower casing and the upper casing.

Hereafter, a more detailed description will be given of the embodiments of the invention on the basis of the embodiments shown in the drawings. It should be noted that the present invention is not limited to these embodiments.

BEST MODE FOR CARRYING OUT THE INVENTION

Figure 1:
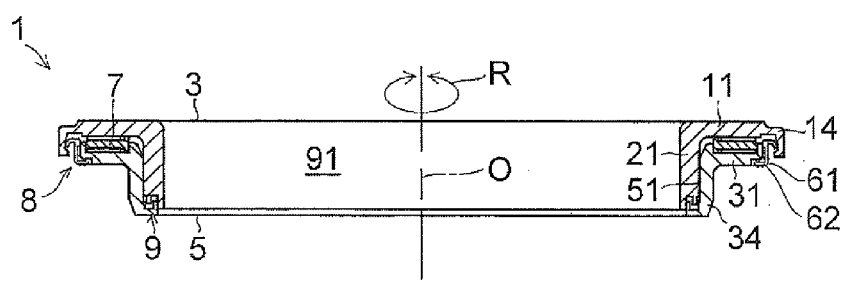
FIG. 1 is an explanatory cross-sectional view of an embodiment of the invention.

In FIGS. 1 to 5, a sliding bearing 1 of this embodiment includes an upper casing 3 having an annular lower surface 2; a lower casing 5 which is superposed on the upper casing 3 so as to be rotatable about an axis O of the upper casing 3 and has an annular upper surface 4 opposed to the annular lower surface 2 of the upper casing 3; an annular thrust sliding bearing piece 7 disposed in an annular space 6 between the annular lower surface 2 and the annular upper surface 4; a seal means 8 disposed on an outer peripheral side of the annular space 6; and a seal means 9 disposed on an inner peripheral side of the annular space 6.

The upper casing 3 includes a circular ring-shaped upper annular plate portion 11 having the aforementioned annular lower surface 2; a hollow cylindrical, large-diameter upper outer cylindrical portion 14 formed integrally with a lower surface 13 (including the annular lower surface 2) on an outer peripheral surface 12 side of the upper annular plate portion 11; a circular ring-shaped annular enlarged portion 18 formed integrally with the portion of an inner peripheral surface 15 of a lower surface 16 side of the upper outer cylindrical portion 14; and a hollow cylindrical, small-diameter upper inner cylindrical portion 21 formed integrally with the lower surface 13 on an inner peripheral surface 19 side of the upper annular plate portion 11.

The annular lower surface 2 is in contact with an annular upper surface 26 of the thrust sliding bearing piece 7 slidably in an R direction.

The inner peripheral surface 15 of the upper outer cylindrical portion 14 has a portion whose diameter becomes larger with increasing distance from the upper annular plate portion 11. In this embodiment, a portion 17 of the inner peripheral surface 15 from the upper annular plate portion 11 to the annular enlarged portion 18 is gradually enlarged in diameter from the upper annular plate portion 11 toward the annular enlarged portion 18.

The annular enlarged portion 18 is formed in such a manner as to bulge from the outer side of the upper casing 3 toward the inner side thereof in the radial direction. Since the annular enlarged portion 18 is thus formed, the annular enlarged portion 18 has a portion which is gradually reduced in diameter from the upper annular plate portion 11 toward the lower side, The upper inner cylindrical portion 21 is inserted in a lower cylindrical portion 34 of the lower casing 5, and a shaft body constituted by a piston rod or the like is adapted to be inserted in a central hole 91 defined by the upper inner cylindrical portion 21.

The lower casing 5 has a circular ring-shaped lower annular plate portion 31 having the annular upper surface 4, as well as the hollow cylindrical lower cylindrical portion 34 which is formed integrally with a lower surface 33 of an inner peripheral surface 32 side of the lower annular plate portion 31.

The lower annular plate portion 31 includes a large-diameter annular plate portion 36, as well as a small-diameter annular plate portion 37 formed integrally with a lower surface 33a of the large-diameter annular plate portion 36.

A circular ring-shaped annular indented portion 42 having a bottom surface serving as the annular upper surface 4 is formed on an upper surface 41 of the large-diameter annular plate portion 36. The thrust sliding bearing piece 7 is adapted to be disposed on the annular indented portion 42. The annular upper surface 4 is in contact with an annular lower surface 27 of the thrust sliding bearing piece 7 sidably in the R direction.

An outer peripheral surface 43b of the small-diameter annular plate portion 37 and the lower surface 33a of the large-diameter annular plate portion 36 form in cooperation with each other an annular stepped portion 44 where a lower portion of an outer peripheral seal portion 61 is disposed on the lower surface 33 on an outer peripheral surface 43 side of the lower casing 5.

An inner peripheral surface 51 of the lower cylindrical portion 34 is in contact with an outer peripheral surface 25 of the upper inner cylindrical portion 21 slidably in the R direction. The portion where the inner peripheral surface 51 of the lower cylindrical portion 34 and the outer peripheral surface 25 of the upper inner cylindrical portion 21 are thus in sliding contact with each other is formed as a radial bearing portion 50.

Figure 5:
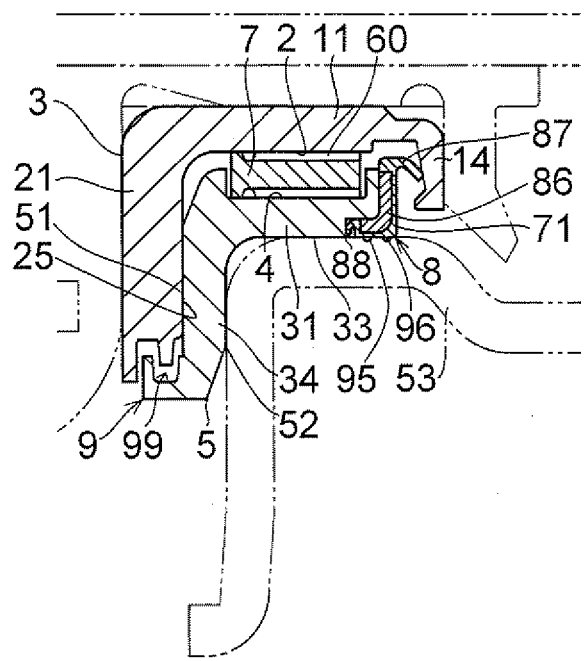
FIG. 5 is a partly enlarged explanatory cross-sectional view concerning the use of the embodiment shown in FIG. 1.

It should be noted that as shown in FIG. 5, a mating member formed by drawing, e.g., a spring seat 53 on top of a coil spring in a strut-type suspension assembly, is adapted to abut against the lower surface 33 of the lower annular plate portion 31 and an outer peripheral surface 52 of the lower cylindrical portion 34.

Figure 2:
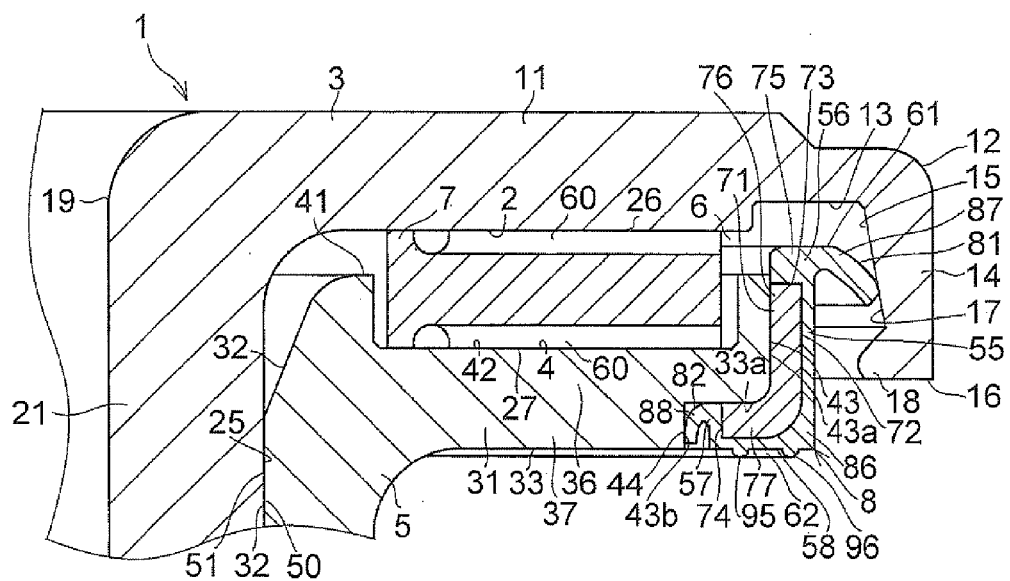
FIG. 2 is a partly enlarged explanatory cross-sectional view of the embodiment shown in FIG. 1.
Figure 7:
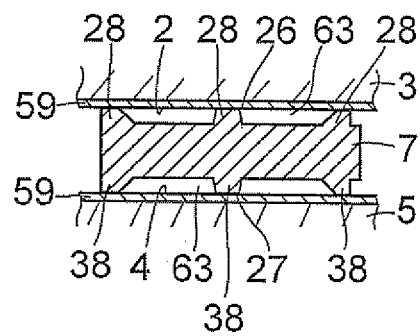
FIG. 7 is a partly enlarged explanatory cross-sectional view of still another embodiment of the invention.

A grease sump groove 60 where grease such as silicone-based grease is disposed may be formed in the thrust sliding bearing piece 7, as shown in FIG. 2. The thrust sliding bearing piece 7 is adapted to be brought into sliding contact with the annular lower surface 2 at its annular upper surface 26 and with the annular upper surface 4 at its annular lower surface 27. In addition, as shown in FIG. 7, the thrust sliding bearing piece 7 may have two or more circular ring-shaped protrusions 28 which are formed integrally with the annular upper surface 26 and are brought into sliding contact with the annular lower surface 2, as well as two or more circular ring-shaped protrusions 38 which are formed integrally with the annular lower surface 27 and are brought into sliding contact with the annular upper surface 4. An annular sheet 59, which is brought into slidable contact with at least one of the thrust sliding bearing piece 7 and the upper casing 3 and/or the lower casing 5, may be interposed between the thrust sliding bearing piece 7 and the upper casing 3 and/or the lower casing 5, as shown in FIG. 7. Such a sheet 59 has a thickness of, for instance, 0.05 mm to 1.0 mm, and is formed of a synthetic resin including at least one of polyamide resin, polyester resin, polyolefin resin, polycarbonate resin, and fluororesin. Grease may be filled in a closed recess 63 which is closed by the sheet 59 and the circular ring-shaped protrusions 28 and/or the circular ring-shaped protrusions 38.

The upper casing 3, the lower casing 5, and the thrust sliding bearing piece 7 are preferably formed of synthetic resin, and the synthetic resin for forming the thrust sliding bearing piece 7 should preferably have self-lubricity, in particular, while the synthetic resin for forming upper casing 3 and the lower casing 5 should preferably excel in mechanical properties, such as wear resistance, shock resistance, creep resistance, and rigidity. Specifically, the synthetic resin for forming the thrust sliding bearing piece 7 includes at least one of polyacetal resin, polyamide resin, polyester resin such as polybutylene terephthalate resin, polyolefin resin such as polyethylene resin and polypropylene resin, polycarbonate resin, and fluororesin. As the synthetic resin for forming the upper casing 3 and the lower casing 5, a synthetic resin similar to the synthetic resin for forming the thrust sliding bearing piece 7 can be used. However, a synthetic resin which exhibits a good frictional property in combination with the synthetic resin for forming the thrust sliding bearing piece 7 and which has relatively high rigidity is particularly preferable. To illustrate its preferable combinations, for the thrust sliding bearing piece 7 and, the upper casing 3 and the lower casing 5, it is possible to cite a combination of polyacetal resin and polyamide resin, a combination of polyethylene resin and polyacetal resin, a combination of polybutylene terephthalate resin and polyacetal resin, and a combination of polyacetal resin and polyacetal resin. A more preferable combination is that of polyethylene resin and polyacetal resin.

The seal means 8 includes the outer peripheral seal portion 61 disposed between the upper casing 3 and the lower casing 5 in such a manner as to seal the outer peripheral side of the annular space 6, as well as an annular elastic projection 62 projecting downward toward the spring seat 53 abutting against the lower surface 33 of the lower casing 5.

The outer peripheral seal portion 61 includes an annular core 71 which is fitted or secured to the lower annular plate portion 31 and has an L-shaped cross section, as well as an annular elastic seal member 75 which is secured to the core 71 so as to cover the core 71.

The core 71 includes an elongated portion 76 which is fitted on an outer peripheral surface 43a of the large-diameter annular plate portion 36 and is elongated in a vertical direction, as well as a short portion 77 which is disposed on the annular stepped portion 44, is fitted on the lower surface 33 on the outer peripheral surface 43 side of the lower casing 5, and extends in a horizontal direction. An outer peripheral surface 72 of the core 71, an upper end surface 73 continuing to an upper edge of the outer peripheral surface 72, and a lower end surface 74 continuing to a lower edge of the outer peripheral surface 72 are covered with an elastic seal member 75. The core 71 is fitted or secured to the lower annular plate portion 31.

The elastic seal member 75 includes an annular body 86 secured to the core 71 so as to cover the core 71; a flexible outer thin-walled annular projecting edge portion 87 which is disposed on an outer peripheral side of the annular body 86, is formed integrally with an upper end, or in this embodiment a below-described portion 56, of that annular body 86, and is brought into siding contact with the inner peripheral surface 15 of the upper outer cylindrical portion 14 SO as to seal the outer peripheral side of the annular space 6; and a flexible inner thin-walled annular projecting edge portion 88 which is disposed on an inner peripheral side of the annular body 86, is formed integrally with a lower end, or in this embodiment a below-described portion 57, of that annular body 86, and is brought into sliding contact with the annular stepped portion 44 of the lower annular plate portion 31 so as to seal the outer peripheral side of the annular space 6. The elastic seal member 75 is formed of a material selected from a crosslinked rubber such as nitrile rubber, chloroprene rubber, fluoro rubber, urethane rubber, and silicone rubber, and a thermoplastic elastomer such as ester-based elastomer, olefin-based elastomer, urethane-based elastomer, and silicone-based elastomer.

The annular body 86 covers the outer peripheral surface 72, the upper end surface 73, and the lower end surface 74 of the core 71. A portion 55 of the annular body 86 covering the outer peripheral surface 72 of the core 71 is annular and has a substantially L-shaped cross section, and the portion 56 of the annular body 86 covering the upper end surface 73 of the core 71 and the portion 57 of the annular body 86 covering the lower end surface 74 of the core 71 are respectively annular. A lower surface 58 of the portion 55 of the annular body 86 is flush with the lower surface 33 in this embodiment.

The outer thin-walled annular projecting edge portion 87 is inclined in such a manner as to be gradually removed away from the upper annular plate portion 11 as the outer thin-walled annular projecting edge portion 87 approaches the upper outer cylindrical portion 14. A maximum diameter of the outer thin-walled annular projecting edge portion 87 thus inclined is larger than or equal to the diameter of the inner peripheral surface 15 of the upper outer cylindrical portion 14 or, in this embodiment, larger than or equal to the maximum diameter of the inner peripheral surface 15. The outer thin-walled annular projecting edge portion 87 is interposed. between the annular body 86 and the upper casing 3 in the radial direction. When the lower casing 5 is pushed inside of the upper outer cylindrical portion 14 of the upper casing 3 and is disposed within that upper outer cylindrical portion 14, the outer thin-walled annular projecting edge portion 87 is flexed while being brought into sliding contact with the inner peripheral surface 15, and is brought into sliding contact with the inner peripheral surface 15 solely at an upper surface 81 of the outer thin-walled annular projecting edge portion 87, as shown in FIG. 2. According to such an outer thin-walled annular projecting edge portion 87, since it is brought into sliding contact with the aforementioned inner peripheral surface 15, the entry of dust, rainwater, muddy water, or the like is prevented with high sealability.

The inner thin-walled annular projecting edge portion 88 is inclined in such a manner as to be gradually removed away from the upper annular plate portion 11 as the inner thin-walled annular projecting edge portion 88 approaches the outer peripheral surface 43b of the small-diameter annular plate portion 37. A minimum diameter of the inner thin-walled annular projecting edge portion 88 thus inclined is smaller than or equal to the diameter of the outer peripheral surface 43b. The inner thin-walled annular projecting edge portion 88 is interposed between the small-diameter annular plate portion 37 and the annular body 86 in the radial direction. When the core 71, at the time of being fitted or secured to the lower annular plate portion 31, is pushed onto the annular stepped portion 44 and is disposed at that annular stepped portion 44, the inner thin-walled annular projecting edge portion 88 is flexed while being brought into sliding contact with outer peripheral surface 43b, and is brought into sliding contact therewith solely at an upper surface 82 of the inner thin-walled annular projecting edge portion 88, as shown in FIG. 2.

The elastic projection 62 includes a small-diameter annular projection 95 formed integrally with the lower surface 58 of the portion 55 of the annular body 86, as well as a large-diameter annular projection 96 formed integrally with the lower surface 58 of the annular body 86 and disposed on the more outer side than the annular projection 95. Respective projecting ends of the annular projections 95 and 96 are located lower than the lower surface 33 of the lower annular plate portion 31. The elastic projection 62 is formed of the same material as that of the elastic seal member 75.

The annular projections 95 and 96 have mutually equal amounts of projection in this embodiment, and project downward by, for example, 0.1 mm or thereabouts from the lower surfaces 33 and 58. Each of the annular projections 95 and 96 has a circular arc-shaped cross section in this embodiment, but may have a triangular cross section, a rectangular cross section, or a trapezoidal cross section, for example. Since each of such annular projections 95 and 96 is formed integrally with the lower surface 58, each of the annular projections 95 and 96 is disposed on the more outer peripheral side than the small-diameter annular plate portion 37 abutting against the spring seat 53 Therefore, each of the annular projections 95 and 96 prevents the entry of dust, rainwater, muddy water, or the like between the spring seat 53 and the lower annular plate portion 31, particularly into the more inner peripheral side of the lower annular plate portion 31 than the annular projections 95 and 96, and furthermore the entry of dust, rainwater, muddy water, or the like into the annular space 6 through the portion between, on the one hand, the annular stepped portion 44 and the large-diameter annular plate portion 36 and, on the other hand, the outer peripheral seal portion 61. In addition, according to each of such annular projections 95 and 96, it is possible to maintain satisfactory sliding between the upper casing 3 and the thrust sliding bearing piece 7 and/or between the lower casing 5 and the thrust sliding bearing piece 7 over extended periods of time by suppressing the relative sliding between the spring seat 53 and the lower casing 5. The sliding bearing 1 in accordance with this embodiment has also the flexible inner thin-walled annular projecting edge portion 88 brought into sliding contact with the outer peripheral surface 43b of the small-diameter annular plate portion 37, and is hence adapted to prevent with higher sealability the above-described entry of dust, rainwater, muddy water, or the like. It should be noted that the annular projection 96 may project downward more than the annular projection 96, or e annular projection 96 may project downward more than the annular projection 95.

Figure 6:
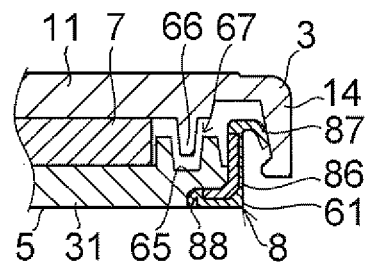
FIG. 6 is a partly enlarged explanatory cross-sectional view of another embodiment of the invention.

It should be noted that, as shown in FIG. 6, the seal means 8 may have, in addition to the above-described configuration, a labyrinth structure 67 which has an annular recess 65 formed integrally with the lower annular plate portion 31 and recessed toward the upper annular plate portion 11, as well as an annular protrusion 66 formed integrally with the upper annular plate portion 11 and protruding toward the lower annular plate portion 31, and which is disposed between the outer peripheral seal portion 61 and the thrust sliding bearing piece 7 with respect to the radial direction.

Figure 3:
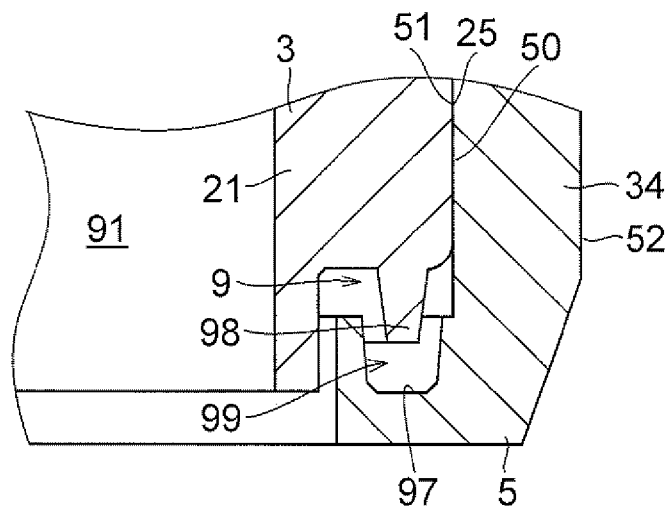
FIG. 3 is a partly enlarged explanatory cross-sectional view of the embodiment shown in FIG. 1.
Figure 4:
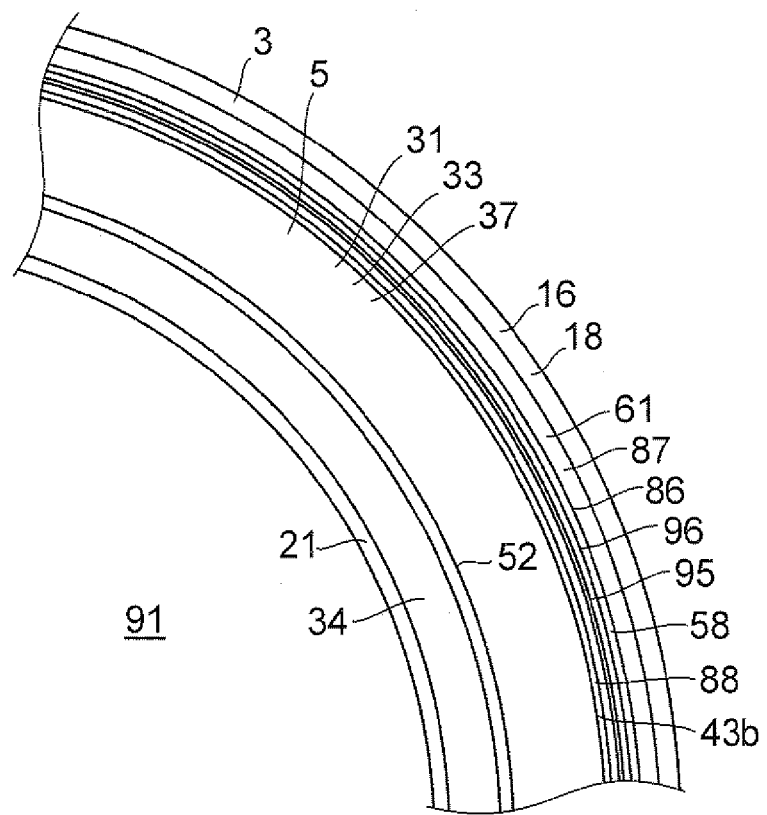
FIG. 4 is a partly enlarged explanatory diagram of the lower surface side of the embodiment shown in FIG. 1.

As shown in FIG. 3, the seal means 9 has an upwardly recessed annular recess 97 which is formed integrally with a lower end of the lower cylindrical portion 34 and a downwardly protruding annular protrusion 98 which is disposed in a space defined by the annular recess 97 and formed integrally with a lower end of the upper inner cylindrical portion 21. The seal means 9 has a labyrinth structure 99 which consists of such an annular recess 97 and an annular protrusion 98, and is adapted to seal the inner peripheral side of the annular space 6 between the upper casing 3 and the lower casing 5 by that labyrinth structure 99. It should be noted that although the seal means 9 in this embodiment has the labyrinth structure 99, the seal means 9 may alternatively have, for instance, an elastic seal means (not shown) interposed between the lower end of the upper inner cylindrical portion 21 and the lower end of the lower cylindrical portion 34.

The above-described sliding bearing 1 is used by being installed between, for example, on the one hand, the spring seat 53 which has been formed by drawing and is located on top of the coil spring in a strut-type suspension assembly and, on the other hand, a mounting member on the vehicle body side to which a piston rod of a hydraulic damper is secured. In this case, an upper portion of the piston rod is inserted in the central hole 91 of the sliding bearing 1 so as to be rotatable about the axis O in the R direction with respect to the upper casing 3 and the lower casing 5. In the strut-type suspension assembly assembled by means of the sliding bearing 1, at the time of the steering operation, the relative rotation of the spring seat 53 about the axis O in the R direction by means of the coil spring is effected by the relative rotation of the lower casing 5 in the same direction with respect to the upper casing 3. It should be noted that since the strut-type suspension is disposed in that portion of the vehicle which is exposed to dust, rainwater, muddy water, or the like during the traveling of the vehicle, the working environment of the sliding bearing 1 incorporated in the strut-type suspension is extremely severe, so that it is important to improve the sealability of the sliding bearing 1.

According to the sliding bearing 1 of this embodiment, the sliding bearing 1 is comprised of the upper casing 3 having the annular lower surface 2; the lower casing 5 which is superposed on the upper casing 3 so as to be rotatable about the axis 0 in the R direction, and has the annular upper surface 4 opposed to the annular lower surface 2 of the upper casing 3; the annular thrust sliding bearing piece 7 disposed in the annular space 6 between the annular lower surface 2 and the annular upper surface 4; and the seal means 8 disposed on the outer peripheral side of the annular space 6. The seal means 8 includes the outer peripheral seal portion 61 disposed between the upper casing 3 and the lower casing 5 so as to seal the outer peripheral side of the annular space 6; and the annular elastic projection 62 formed on the lower surface 58 of the outer peripheral seal portion 61 and projecting toward the spring seat 53 formed by drawing and serving as the mating member abutting against the lower surface 33 of the lower casing 5. Therefore, even in a case where the fabrication accuracy of the spring seat 53 abutting against the lower casing 5 is low, by causing that elastic projection 62 to elastically abut against the spring seat 53, an unwanted gap, particularly a gap leading to between the lower casing 5 and the upper casing 3, is not produced between the lower casing 5 and the spring seat 53. Thus, it is possible to prevent with high sealability the entry of dust, rainwater, muddy water, or the like between the lower casing 5 and the spring seat 53, and hence the entry of dust, rainwater, muddy water, or the like between the lower casing 5 and the upper casing 3.

According to the sliding bearing 1, the upper casing 3 includes the upper annular plate portion 11 having the annular lower surface 2 and the upper outer cylindrical portion 14 formed integrally with the lower surface 13 on the outer peripheral surface 12 side of the upper annular plate portion 11, while the lower casing 5 includes the lower annular plate portion 31 having the annular upper surface 4. The lower annular plate portion 31 has the large-diameter annular plate portion 36, as well as the small-diameter annular plate portion 37 formed integrally with the lower surface 33a of the large-diameter annular plate portion 36. The lower surface 33a of the large-diameter annular plate portion 36 and the outer peripheral surface 43b of the small-diameter annular plate portion 37 form in cooperation with each other the annular stepped portion 44 on the lower surface 33 on the outer peripheral surface 43 side of the lower casing 5. The outer peripheral seal portion 61 includes the annular core 71 which is fitted or secured to the lower annular plate portion 31 and has an L-shaped cross section, as well as the annular elastic seal member 75 which is secured to the core 71 so as to cover the core 71. The elastic seal member 75 includes the annular body 86 secured to the core 71 so as to cover the core 71; the flexible outer thin-walled annular projecting edge portion 87 which is disposed on the outer peripheral side of the annular body 86, is formed integrally with an upper end of that annular body 86, and is brought into sliding contact with the inner peripheral surface 15 of the upper outer cylindrical portion 14 so as to seal the outer peripheral side of the annular space 6; and the flexible inner thin-walled annular projecting edge portion 88 which is disposed on the inner peripheral side of the annular body 86, is formed integrally with a lower end of that annular body 86, and is brought into sliding contact with the annular stepped portion 44 so as to seal the outer peripheral side of the annular space 6. Therefore, the elastic projection 62 makes it possible to prevent the entry of dust, rainwater, muddy water, or the like between the lower casing 5 and the spring seat 53 abutting against the lower surface 33 of this lower casing 5. Furthermore, the inner thin-walled annular projecting edge portion 88 makes it possible to prevent the entry of dust, rainwater, muddy water, or the like between the lower casing 5 and the upper casing 3. Hence, the entry of dust, rainwater, muddy water, or the like can be prevented with higher sealability.

According to the sliding bearing 1, the outer thin-walled annular projecting edge portion 87 is inclined in such a manner as to be gradually removed away from the upper annular plate portion 11 as the outer thin-walled annular projecting edge portion 87 approaches the upper outer cylindrical portion 14. Further, the maximum diameter of the outer thin-walled annular projecting edge portion 87 is larger than or equal to the diameter of the inner peripheral surface 15 of the upper outer cylindrical portion 14. Therefore, it is possible to eliminate the possibility of the outer thin-walled annular projecting edge portion 87 being removed away from the upper outer cylindrical portion 14, thereby allowing high scalability to be exhibited.

According to the sliding bearing 1, the inner thin-walled annular projecting edge portion 88 is inclined in such a manner as to be gradually removed away from the upper annular plate portion 11 as the inner thin-walled annular projecting edge portion 88 approaches the outer peripheral surface 43b of the small-diameter annular plate portion 37. Further, the minimum diameter of the inner thin-walled annular projecting edge portion 88 is smaller than or equal to the diameter of the outer peripheral surface 43b of the small-diameter annular plate portion 37. Therefore, high sealability can be exhibited by the inner thin-walled annular projecting edge portion 88 as well.

The invention claimed is:

1. A sliding bearing adapted to be installed between a spring seat and a mounting member, the spring seat being located on top of a coil spring in a strut-type suspension assembly and the mounting member being located on a vehicle body side to which a piston rod of a hydraulic damper is secured, the sliding bearing comprising:
   an upper casing having an annular lower surface;
   a lower casing which is superposed on said upper casing so as to be rotatable about an axis of said upper casing and has an annular upper surface opposed to the annular lower surface of said upper casing in an axial direction;
   an annular thrust sliding bearing piece disposed in an annular space between the annular lower surface and the annular upper surface;
   a first seal disposed on an outer peripheral side of the annular space; and
   a second seal disposed on an inner peripheral side of the annular space,
   wherein said annular thrust sliding bearing piece has an annular upper surface and an annular lower surface,
   wherein said first seal includes an outer peripheral seal portion disposed between said upper casing and said lower casing so as to seal the outer peripheral side of the annular space, and an annular elastic projection projecting toward a mating member facing to a lower surface of said lower casing,
   wherein said upper casing includes an upper annular plate portion having the annular lower surface of the upper casing and an upper outer cylindrical portion united with a lower surface on an outer peripheral surface side of the upper annular plate portion, and said lower casing includes a lower annular plate portion having the annular upper surface of the lower casing,
   the lower annular plate portion having a large-diameter annular plate portion and a small-diameter annular plate portion united with a lower surface of the large-diameter annular plate portion,
   the lower surface of the large-diameter annular plate portion and an outer peripheral surface of the small-diameter annular plate portion forming in cooperation with each other an annular stepped portion on the lower surface on an outer peripheral surface side of said lower casing,
   the outer peripheral seal portion including an annular core which is fitted or secured to the lower annular plate portion and has an L-shaped cross section, and an annular elastic seal member which is secured to the core so as to cover the core,
   the elastic seal member including: an annular body secured to the core so as to cover the core; a flexible outer thin-walled annular projecting edge portion which is disposed on an outer peripheral side of the annular body, is united with an upper end of the annular body, and is brought into sliding contact with an inner peripheral surface of the upper outer cylindrical portion so as to seal the outer peripheral side of the annular space; and a flexible inner thin-walled annular projecting edge portion which is disposed on an inner peripheral side of the annular body, is united with a lower end of the annular body, and is brought into sliding contact with the annular stepped portion so as to seal the outer peripheral side of the annular space,
   said annular elastic projection being united with a lower surface of the annular body between the outer thin-walled annular projecting edge portion and the inner thin-walled annular projecting edge portion,
   said annular elastic projection including a small-diameter annular projection formed integrally on the lower surface of the annular body and a large-diameter annular projection formed integrally on the lower surface of the annular body and disposed on a more radially outer side than the small-diameter annular projection,
   said small-diameter annular projection and said large-diameter annular projection being disposed on a more radially outer side than the inner thin-walled annular projecting edge portion, and having a semi-circular and rounded outer surface in a vertical cross-sectional view, respectively, and
   said small-diameter annular projection and said large-diameter annular projection abutting against the mating member on the semi-circular and rounded outer surface thereof,
   wherein the outer thin-walled annular projecting edge portion is inclined in such a manner as to be gradually removed away from the upper annular plate portion as the outer thin-walled annular projecting edge portion approaches the upper outer cylindrical portion, and a maximum diameter of the outer thin-walled annular projecting edge portion is larger than or equal to a diameter of the inner peripheral surface of the upper outer cylindrical portion,
   wherein the inner thin-walled annular projecting edge portion is inclined in such a manner as to be gradually removed away from the upper annular plate portion as the inner thin-walled annular projecting edge portion approaches the outer peripheral surface of the small-diameter annular plate portion, and a minimum diameter of the inner thin-walled annular projecting edge portion is smaller than or equal to a diameter of the outer peripheral surface of the small-diameter annular plate portion,
   wherein the outer peripheral seal portion and the elastic projection are formed of a crosslinked rubber or a thermoplastic elastomer,
   wherein said core includes an elongated portion which is brought into contact with an outer peripheral surface of the large-diameter annular plate portion and is elongated in a axial direction, and a short portion which is disposed on the annular stepped portion, is fitted on the lower surface on the outer peripheral surface side of the lower casing, and extends in a horizontal direction,
   wherein an outer peripheral surface of the core, an upper end surface of the core continuously connecting to an upper edge of the outer peripheral surface of the core, and a lower end surface continuously connecting to a lower edge of the outer peripheral surface of the core are covered with the annular body of the elastic seal member, wherein a lower surface of the outer thin-walled annular projecting edge portion is located below the upper end surface of the core in the axial direction, wherein said upper end surface of the core is located below an upper edge surface of the elastic seal member in the axial direction, and wherein an upper surface of the large-diameter annular plate portion is located between the upper edge surface of the elastic seal member and the upper edge surface of the core in the axial direction.

2. The sliding bearing according to claim 1, wherein at least one of said upper casing and said lower casing is formed of a synthetic resin, and the synthetic resin for forming at least one of said upper casing and said lower casing includes at least one of polyacetal resin, polyamide resin, polyester resin, polyolefin resin, polycarbonate resin, and fluororesin.

3. The sliding bearing according to claim 1, wherein said thrust sliding bearing piece is formed of a synthetic resin, and the synthetic resin for forming said thrust sliding bearing piece includes at least one of polyacetal resin, polyamide resin, polyester resin, polyolefin resin, polycarbonate resin, and fluororesin.

4. The sliding bearing according to claim 1, wherein the thrust sliding bearing piece further comprises two or more circular ring-shaped upper protrusions formed integrally with the annular upper surface of the thrust sliding bearing piece and two or more circular ring-shaped lower protrusions formed integrally with the annular lower surface of the thrust sliding bearing piece.

5. The sliding bearing according to claim 4, wherein the circular ring-shaped upper protrusions and the circular ring-shaped lower protrusions define, at least in part, corresponding recesses to receive grease between the thrust sliding bearing and the upper and lower casings, respectively.

6. The sliding bearing according to claim 1, further comprising at least one annular sheet interposed between the thrust sliding bearing piece and the upper casing and/or the lower casing.

\* \* \* \* \*